United States Patent
Fujii

[11] 3,796,481
[45] Mar. 12, 1974

[54] VARIFOCAL LENS SYSTEMS
[75] Inventor: Toru Fujii, Tokyo, Japan
[73] Assignee: Olympus Optical Company Limited, Tokyo, Japan
[22] Filed: Apr. 28, 1972
[21] Appl. No.: 248,537

[30] Foreign Application Priority Data
May 1, 1971 Japan.............................. 46-29159
Jan. 14, 1972 Japan.............................. 47-6465

[52] U.S. Cl.................................. 350/184, 350/214
[51] Int. Cl. ............................................ G02b 15/16
[58] Field of Search........................... 350/184, 186

[56] References Cited
UNITED STATES PATENTS
3,615,125  10/1971  Higuchi et al. ..................... 350/184
3,501,224  3/1970  Takahashi.......................... 350/184

Primary Examiner—John K. Corbin
Attorney, Agent, or Firm—Waters, Roditi, Schwartz & Nissen

[57] ABSTRACT

This varifocal lens system or so-called zoom lens system has four groups of lenses of which the second group of lenses is constructed as 3 components and 4 lenses and defined by the following six conditions, i.e.

$$r_{B1} < 0 \quad \ldots (1)$$

$$2.0|f_B| < |r_{B1}| < \infty \quad \ldots (2)$$

$$0 \leq |(1/r_{B3}) - (1/r_{B4})| < (0.4/|f_B|) \quad \ldots (3)$$

$$0.5|f_B| < (r_{B5} + |r_{B6}|/2) < 2.0|f_B| \quad \ldots (4)$$

$$0.08 < n_{B2} - n_{B1} \quad \ldots (5)$$

$$20 < \nu_{B1} - \nu_{B2} \quad \ldots (6)$$

where $r_{Bi}$ ($i=1, 2, \ldots$) are radii of curvatures of the surfaces of the successive lenses from the front face of the first lens and inclusive of the surface in contact between the first and second lenses of the second group of lenses, $n_{Bi}$ ($i=1, 2, \ldots$) are axial center thicknesses of or air spaces between the successive lenses of the second group of lenses, $\nu_{Bi}$ ($i=1, 2, \ldots$) are Abbe's numbers of the successive lenses of the second group of lenses and $f_B$ is a composite focal length of the second group of lenses.

This second group of lenses defined as above described is combined with the fourth group of lenses which is constructed as three groups of lenses and defined by the following six conditions, i.e.

$$|(f_{DF}/f_D)| < 0.7 \quad \ldots (1)$$

$$0.1 < n_{M2} - n_{M1} < 0.3 \quad \ldots (2)$$

$$0.2f_D < -r_{DB} < 0.4f_D \quad \ldots (3)$$

$$|(1/f_{DB1} + 1/f_{DB2}/1/f_D)| < 0.8 \quad \ldots (4)$$

$$0 < t_{DB} < 0.3f_D \quad \ldots (5)$$

$$0.4 < \Sigma P_D < 1.0 \quad \ldots (6)$$

where $f_D$ is a composite focal length of the fourth group of lenses $L_D$, $f_{DF}$ is a focal length of the front group of lenses $L_{DF}$, $n_{M1}$ and $n_{M2}$ are refractive indexes of the front positive lens and back negative lens of the middle group of lenses $L_{DM}$, respectively, $f_{DB1}$ and $f_{DB2}$ are focal lengths of the front positive lens and back negative lens of the back group of lenses $L_{DB}$, respectively, $t_{DB}$ is an air space between the front positive lens and the back negative lens of the back group of lenses $L_{DB}$, $r_{DB}$ is a radius of curvature of the surface facing the air space of the front positive lens of the back group of lenses $L_{DB}$, and $P_D$ is a Petzval sum of the fourth group of lenses as a whole.

4 Claims, 38 Drawing Figures

Fig.3a
f=76.5mm
F/4
g-line
F-line
d-line
-0.5mm 0.5mm

Fig.3b
f=108.18mm
F/4
F-line
g-line
d-line
-0.5mm 0.5mm

Fig.3c
f=153mm
F/4
F-line
g-line
d-line
-0.5mm 0.5mm

Fig.4a
f=80mm
F/4
F-line
g-line
d-line
0.5mm 0.5mm

Fig.4b
f=113mm
F/4
g-line
F-line
d-line
0.5mm 0.5mm

Fig.4c
f=160mm
F/4
g-line
F-line
d-line
0.5mm 0.5mm

Fig. 6a
f=76.5mm
F/4
d-line, F-line, g-line
-0.5mm 0.5mm

Fig. 6b
f=108.18mm
F/4
d-line, F-line, g-line
-0.5mm 0.5mm

Fig. 6c
f=153mm
F/4
F-line, g-line, d-line
-0.5mm 0.5mm

VARIFOCAL LENS SYSTEMS

This invention relates to varifocal lens systems or so-called zoom lens systems in which a part or all of the optical systems is or are moved in a direction of the optical axis to vary the focal length of the total lens system, and particularly to a so-called mechanically correctable type zoom lens comprising a varifocal optical system and a prime optical system, the varifocal optical system consisting of a first group of lenses having a positive refractive power, second group of lenses having a negative refractive power and third group of lenses having a positive refractive power, the prime optical system consisting of a fourth group of lenses having a positive refractive power and the change in position of the final image produced by the movement in a direction of the optical axis of the second group of lenses being adapted to be corrected by the reciprocal movement of the third group of lenses.

In such kind of varifocal lens systems, the variation of the composite focal length thereof is mainly resulted from the movement of the second group of lenses. Thus, the second group of lenses plays an important role in correcting abberations.

In general, it is important for varifocal lens systems and more particularly for a zoom lens system for use in 35 mm still camera to shorten the total length of the zoom lens system inclusive of its back focus. But, various difficult problems have been encountered with the optical design of shortening the total length of the zoom lens system. It might be considered to shorten the length of the varifocal optical system or to make a telephoto ratio (a ratio of the total length of a lense system to a composite focal length of the lens system) of the fourth group of lenses constituting the prime optical system small, so that the total length of the zoom lens system could be shortened. But, if the condition that the effective diameter of the front lens of the fourth group of lenses should not be excessively large is taken into consideration, the pupil for the fourth group of lenses has often to be unsymmetrically located with respect to the arrangement of lenses. Moreover, if the telephoto ratio of the fourth group of lenses is made small a positive lens having a large refractive power must be positioned in front of the fourth group of lenses, with the result that the coma out of axis becomes unavoidably increased. Thus, it is impossible to make the telephoto ratio of the fourth group of lenses smaller than a certain limited ratio.

The total length of the zoom lens system may effectively be shortened by shortening the focal length of the second group of lenses of the varifocal optical system under the condition that the zoom ratio is constant. But, if the focal length of the second group of lenses of the varifocal optical system becomes shortened, it becomes very difficult to balance the aberrations resulted from zooming.

An object of the invention, by adopting novel second group of lenses which has hitherto not been proposed, is to provide a varifocal lens system which is compact in construction, short in total length and is capable of reliably varying the focal length of the total lens system with substantially no influence upon the aberrations.

A feature of the invention is the provision of a varifocal lens system comprising second group of lenses constructed as 3 components and 4 lenses and consisting of a first biconcave negative lens, a second biconvex positive lens, a third negative lens and a fourth negative lens, said first and second lenses being combined together to form a composite lens having a positive refractive power, said third negative lens having at its image side a deep concave surface, said fourth negative lens having at its object side a deep concave surface, said third and fourth lenses being arranged such that their deep concave surfaces stand opposite each other with an air space therebetween, and said second group of lenses being defined by the following six conditions, i.e.

$$r_{B1} < 0 \quad \ldots (1)$$

$$2.0|f_B| < |r_{B1}| < \infty \quad \ldots (2)$$

$$0 \leq |(1/r_{B3}) - (1/r_{B4})| < (0.4)/(|f_B|) \quad \ldots (3)$$

$$0.5|f_B| < (r_{B5} + |r_{B6}|)/2 < 2.0|f_B| \quad \ldots (4)$$

$$0.08 < n_{B2} - n_{B1} \quad \ldots (5)$$

$$20 < \nu_{B1} - \nu_{B2} \quad \ldots (6)$$

where $r_{Bi}$ ($i=1, 2, \ldots$) are radii of curvatures of the surfaces of the successive lenses from the front face of the first lens and inclusive of the surface in contact between the first and second lenses of the second group of lenses, $d_{Bi}$ ($i=1, 2, \ldots$) are axial center thicknesses of or air spaces between the successive lenses of the second group of lenses, $\nu_{Bi}$ ($i=1, 2, \ldots$) are Abbe's numbers of the successive lenses of the second group of lenses, and $f_B$ is a composite focal length of the second group of lenses.

Various further and more specific objects, features and advantages of the invention will appear from the description given below, taken in connection with the accompanying drawing illustrating by way of example preferred embodiments of the invention.

Figure 1:
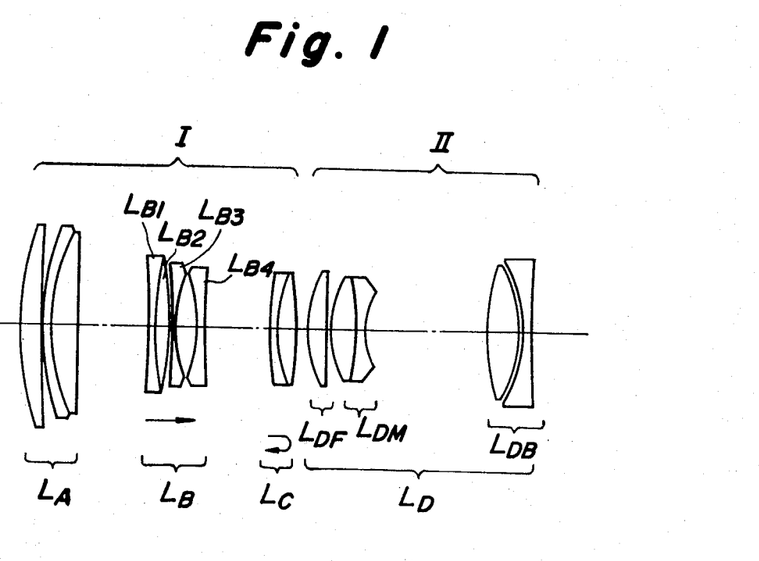
FIG. 1 shows in cross-section a construction of a varifocal lens system according to the invention.

Referring now to FIG. 1 showing a construction of a varifocal lens system according to the invention, in which I designates a varifocal optical system and II a prime optical lens system. The varifocal optical system I consists of a first group of lenses $L_A$ having a positive refractive power, second group of lenses $L_B$ having a negative refractive power and third group of lenses $L_C$ having a positive refractive power. The prime optical system II consists of a fourth group of lenses $L_D$ having a positive refractive power. The fourth group of lenses $L_D$ comprises a front group of lenses $L_{DF}$ consisting of a single lens (FIG. 1) or two independent lenses (FIG. 2), a middle group of lenses $L_{DM}$ consisting of a front positive lens and a back negative lens, and a back group of lenses $L_{DB}$ consisting of a front positive lens and a back negative lens.

The second group of lenses $L_B$ is moved in a direction of the optical axis as shown by an arrow to vary the focal length. The change in position of the final image produced by the movement of the second group of lenses $L_B$ is corrected by reciprocating the third group of lenses $L_C$ as shown by a curved arrow.

In accordance with the invention, the second group of lenses $L_B$ is constructed as 3 components and 4 lenses $L_{B1}$, $L_{B2}$, $L_{B3}$, $L_{B4}$. The first lens $L_{B1}$ is made as a biconcave negative lens, and the second lens $L_{B2}$ as biconvex positive lens. These first and second lenses $L_{B1}$ and $L_{B2}$ are combined together to form a composite lens having a positive refractive power. The third lens $L_{B3}$ is made as a negative lens that has at its image side a deep concave surface and the fourth lens $L_{B4}$ is made as a negative lens that has at its object side a deep concave surface. These third and fourth lenses $L_{B3}$ and $L_{B4}$ are so arranged that their deep concave surfaces stand opposite each other with an air space therebetween. All lenses $L_{B1}$, $L_{B2}$, $L_{B3}$, $L_{B4}$ of the second group of lenses $L_B$ are arranged in succession from the side of an object (not shown) and are defined by the following six conditions, i.e.

$$r_{B1} < 0 \quad \ldots (1)$$

$$2.0|f_B| < |r_{B1}| < \infty \quad \ldots (2)$$

$$0 \leq |(1/r_{B3}) - (1/r_{B4})| < (0.4/|f_B|) \quad \ldots (3)$$

$$0.5|f_B| < (r_{B5} + |r_{B6}|)/2 < 2.0|f_B| \quad \ldots (4)$$

$$0.08 < n_{B2} - n_{B1} \quad \ldots (5)$$

$$20 < \nu_{B1} - \nu_{B2} \quad \ldots (6)$$

where $r_{Bi}$ ($i=1, 2, \ldots$) are radii of curvatures of the surfaces of the successive lenses $L_{B1}$, $L_{B2}$, $L_{B3}$, $L_{B4}$ from the front surface of the first lens $L_{B1}$ and inclusive of the surface in contact between the first and second lenses $L_{B1}$ and $L_{B2}$, $n_{Bi}$ ($i=1, 2, \ldots$) are axial center thicknesses of or air spaces between the successive lenses $L_{B1}$, $L_{B2}$, $L_{B3}$, $L_{B4}$, $\nu_{Bi}$ ($i=1, 2, \ldots$) are Abbe's numbers of the successive lenses $L_{B1}$, $L_{B2}$, $L_{B3}$, $L_{B4}$, and $f_B$ is a composite focal length of the second group of lenses $L_B$.

Heretofore, it has been proposed to construct the above mentioned second group of lenses $L_B$ by 2 groups and three lenses. Such conventional second group of lenses comprises a first composite lens consisting of a front convex lens and a back concave lens and having a negative refractive power, the back concave lens having its image side a deep concave surface, and a second concave lens that has its object side a deep concave surface arranged in opposition to the deep concave surface of the back concave lens of the first composite lens. The deep concave surface of this second concave lens serves to correct the spherical aberration, but produces the coma which is difficult to be corrected by the first composite lens when the picture angle becomes large. Such difficulty may be obviated by introducing an air space between the surface in contact of the first composite lens and by increasing the positive refractive power of the back surface of the front convex lens of the first composite lens. These measures are effective to suitably balance the aberrations, but have the disadvantage that the front convex lens of the first composite lens must be made of a glass of which dispersion is large in order to stabilize the chromatic aberration near axis throughout the varifocal optical system and that the above mentioned introduction of the air space tends to produce the chromatic coma flare out of axis, particularly, at the wide end of the picture angle.

With the varifocal lens system according to the invention, the biconcave negative lens $L_{B1}$ is made in contact with the front surface of the biconvex positive lens $L_{B2}$ such that the chromatic coma produced by the biconvex positive lens $L_{B2}$ acts in a direction opposite to the chromatic coma produced by the biconcave negative lens $L_{B1}$ to eliminate it. In this case, it is preferable to make the positive refractive power at the front surface of the biconvex positive lens $L_{B2}$ weak.

The invention is based on such recognition and the second group of lenses $L_B$ is constructed as 3 components and 4 lenses $L_{B1}$, $L_{B2}$, $L_{B3}$, $L_{B4}$ and defined by the above mentioned six conditions and provides a varifocal lens system which is compact in construction, short in total length and is capable of reliably varying the focal length of the total lens system with substantially no influence upon the aberrations.

Now, the reasons why the varifocal lens system according to the invention should be defined by the above mentioned six conditions will be explained.

The condition (1) that $r_{B1}<0$ is effective to correct the coma at the wide end of the large picture angle. $|r_{B1}|$ defined by the condition (2) that $2.0|f_B| < |r_{B1}| < \infty$ together with the deep concave surfaces $r_{B5}$, $r_{B6}$ of the third and fourth lenses $L_{B3}$, $L_{B4}$ defined by the condition (4) suitably balance the coma produced at the back surface $r_{B3}$ of the second lens $L_{B2}$. In the condition (2), if $|r_{B1}|$ is considerably smaller than $2|f_B|$, the negative action of the front surface $r_{B1}$ of the first lens $L_{B1}$ becomes so excessive that it becomes difficult to maintain the above mentioned balance of coma. At the same time, the condition (2) is associated with the correction of the distortion at relatively short focal length such that if $r_{B1}$ is excessively small the negative distortion at the wide end of the picture angle becomes increased. The spherical aberration may be made small by satisfying the conditions (3) and (5). The condition (4) is capable of making the variation of the spherical aberration small. Moreover, the conditions (2), (3) and (6) serve to make the chromatic coma flare small. The condition (5) effectively balances the astigmatism at each varifocal position.

The use of the second group of lenses $L_B$ constructed and defined as above described provides a varifocal lens system which is capable of shortening the focal length $f_B$ of the second group of lenses $L_B$ with substantially no influence upon the aberrations.

The first group of lenses $L_A$ may be constructed as one group and two lenses combined together to form a composite lens or may be constructed as two components and three lenses inclusive of a composite lens by taking the picture angle, zoom ratio, etc. into consideration. The spherical aberration and chromatic aberration at near axis must be eliminated from the first group of lenses $L_A$. But, it is not particularly difficult to effect such elimination unless lenses having small F number are used.

The third group of lenses $L_C$ has not a particularly high zoom ratio and the change in the chromatic aberration is out of the problem and hence the third group of lenses $L_C$ may be constructed as a single lens, doublet lens, etc. The third group of lenses $L_C$ may be thin in thickness without degrading the utility of the varifocal lens system according to the invention with respect to the correction of aberrations.

In accordance with the invention, the varifocal optical system I constructed as above described is combined with a fourth group of lenses $L_D$ to provide various types of varifocal lens systems. It is preferable to use a fourth group of lenses $L_D$ having a small telephoto ratio for the purpose of shortening the total length of the varifocal lens system. But, the telephoto ratio should be limited to a value which does not significantly degrade the coma out of axis. The Petzval sum of the fourth group of lenses $L_D$ should preferably be larger than 0.4 for the purpose of correcting the curvature of the image surface produced by the varifocal optical systems I. The reason for this is as follows. The Petzval sum of the varifocal optical system I is always given by a large negative value in order to correct the chromatic aberration at near axis. If the Petzval sum of the fourth group of lenses $L_D$ becomes smaller than 0.4, the flat image produced by the varifocal lens system as a whole becomes degraded. Conversely, if the Petzval sum of the prime optical system II becomes larger than 1.0, it becomes more difficult to correct the sagittal image surface. Thus, in accordance with the invention, the Petzval sum $\Sigma P_D$ of the fourth group of lenses $L_D$ is defined by $0.4 \Sigma P_D < 1.0$.

Figure 2:
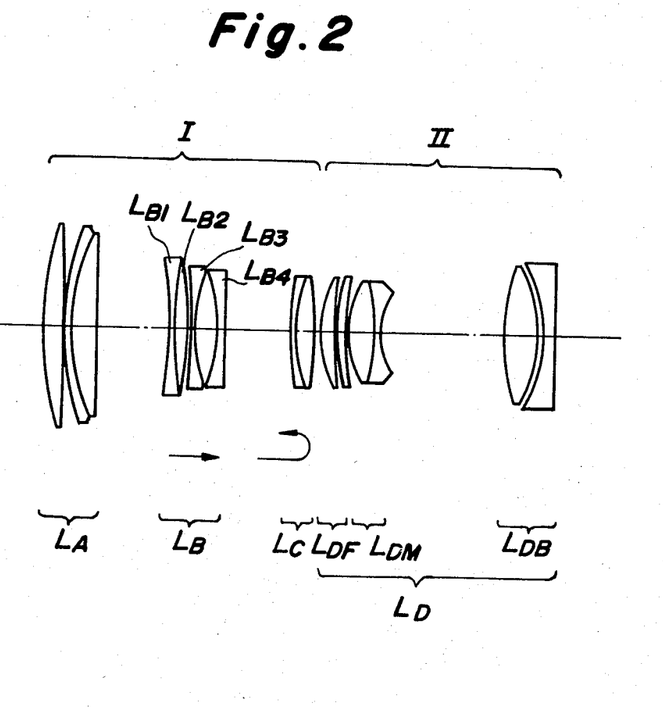
FIG. 2 is the same as FIG. 1 but for a modified form.

The front group of lenses $L_{DF}$ of the prime optical system II consists of a single lens (FIG. 1) or two independent lenses (FIG. 2). The composite focal length $f_{DF}$ of the front group of lenses $L_{DF}$ plays an important role of decreasing the telephoto ratio of the prime optical system II. In order to decrease this telephoto ratio, the following condition must be satisfied $$|f_{DF}/f_D| < 0.7$$

where $f_D$ is the composite focal length of the prime optical system II. The composite focal length $f_{DF}$ of the front group of lenses $L_{DF}$ defined as described above makes the negative spherical aberration and chromatic coma produced by the front group of lenses $L_{DF}$ large.

Thus, it is necessary to eliminate such negative spherical aberration and chromatic coma by the strong concave action of the middle group of lenses $L_{DM}$. This strong concave action of the middle group of lenses $L_{DM}$ is obtained by the refractive index $n_{M1}$ of the front positive lens and the refractive index $n_{M2}$ of the back negative lens of the middle group of lenses $L_{DM}$ as defined by the condition that $$0.1 < n_{M2} - n_{M1} < 0.3.$$

The front positive lens and back negative lens of the middle group of lenses $L_{DM}$ having such refractive indexes as defined by the above condition may be brought into contact or may be separated one from the other with an air space therebetween. The positive and negative lenses of the back group of lenses $L_{DB}$ of the prime optical system II is constructed such that the unsymmetry of coma out of axis is eliminated and that the composite refractive power of both lenses is defined by the condition that $$|(1/f_{DB1} + 1/f_{DB2})/1/f_D| < 0.8$$

where $f_{DB1}$ and $f_{DB2}$ are focal lengths of the front positive and back negative lenses of the back group of lenses $L_{DB}$, respectively. The positive and negative lenses of the back group of lenses $L_{DB}$ constructed as above described is effective to make the telephoto ratio of the fourth group of lenses $L_D$ small and to define the Petzval sum $P_D$ by the condition that $0.4 < P_D < 1.0$. In the condition that $$|(1/f_{DB1} + 1/f_{DB2})/1/f_D| < 0.8,$$

if the left side becomes larger than 0.8 the back group of lenses $L_{DB}$ produces the unsymmetry of coma. This unsymmetry of coma can be eliminated by the radius of curvature $r_{DB}$ of the front positive lens facing the air space of the back group of lenses $L_{DB}$ as defined by $$0.2 f_D < -r_{DB} < 0.4 f_D.$$

This condition is capable of effectively eliminating the sagittal coma out of axis. If $-r_{DB}$ is smaller than $0.2 f_D$ the above eliminating action becomes excessive, and as a result, the unsymmetry of coma is produced. If $-r_{DB}$ is larger than $0.4 f_D$ the above eliminating action becomes less effective.

The air space $t_{DB}$ between the positive and negative lenses of the back group of lenses $L_{DB}$ is defined by $$0 < t_{DB} < 0.3 f_D.$$

The air space $t_{DB}$ as defined above serves to strengthen the action of $r_{DB}$ and effectively balances the chromatic coma. If $t_{DB}$ is larger than $0.3 f_D$, it is difficult to correct the astigmatism out of axis.

The invention will now be described with reference to the following examples.

EXAMPLE 1

A varifocal lens system of the present example is constructed as shown in FIG. 1.

The present embodiment is defined by the values as mentioned in the following Table.

f=76.5 mm.-153 mm., F/4

| | | | | |
|---|---|---|---|---|
| $f_A = 100.023$ | $r_{A1}=78.829$<br>$r_{A2}=441.679$<br>$r_{A3}=74.639$<br>$r_{A4}=44.11$<br>$r_{A5}=1,742.45$ | $d_{A1}=4.09$<br>$d_{A2}=0.19$<br>$d_{A3}=1.9$<br>$d_{A4}=5.8$<br>$d_{A5}=2.086\text{-}26.433$ | $n_{A1}=1.51633$<br>$n_{A2}=1.74077$<br>$n_{A3}=1.51821$ | $\nu_{A1}=64.15$<br>$\nu_{A2}=27.79$<br>$\nu_{A3}=65.04$ |
| $f_B = -34.432$ | $r_{B1}=-175.362$<br>$r_{B2}=133.175$<br>$r_{B3}=-80.74$<br>$r_{B4}=-214.635$<br>$r_{B5}=39.98$<br>$r_{B6}=-35.068$<br>$r_{B7}=626.88$ | $d_{B1}=1.7$<br>$d_{B2}=2.96$<br>$d_{B3}=0.38$<br>$d_{B4}=1.43$<br>$d_{B5}=5.26$<br>$d_{B6}=1.43$<br>$d_{B7}=25.371\text{-}1.024$ | $n_{B1}=1.618$<br>$n_{B2}=1.7846$<br>$n_{B3}=1.5725$<br>$n_{B4}=1.618$ | $\nu_{B1}=63.38$<br>$\nu_{B2}=26.22$<br>$\nu_{B3}=57.65$<br>$\nu_{B4}=63.38$ |
| $f_C = 88.145$ | $r_{C1}=84.07$<br>$r_{C2}=36.191$<br>$r_{C3}=-105.44$ | $d_{C1}=1.13$<br>$d_{C2}=3.95$<br>$d_{C3}=6.707\text{-}6.707$ | $n_{C1}=1.74077$<br>$n_{C2}=1.6223$ | $\nu_{C1}=27.79$<br>$\nu_{C2}=53.2$ |
| $f_D = 95.347$ | $r_{D1}=24.56$<br>$r_{D2}=\infty$<br>$r_{D3}=24.442$<br>$r_{D4}=-61.605$<br>$r_{D5}=17.088$<br>$r_{D6}=57.836$<br>$r_{D7}=-31.791$<br>$r_{D8}=-30.887$<br>$r_{D9}=455.31$ | $d_{D1}=4.78$<br>$d_{D2}=0.38$<br>$d_{D3}=6.12$<br>$d_{D4}=2$<br>$d_{D5}=28.87$<br>$d_{D6}=7$<br>$d_{D7}=1.43$<br>$d_{D8}=1.43$ | $n_{D1}=1.51633$<br>$n_{D2}=1.51009$<br>$n_{D3}=1.744$<br>$n_{D4}=1.60342$<br>$n_{D5}=1.66998$ | $\nu_{D1}=64.15$<br>$\nu_{D2}=63.63$<br>$\nu_{D3}=44.78$<br>$\nu_{D4}=38.01$<br>$\nu_{D5}=39.32$ |

In the above Table, $f_A$, $f_B$, $f_C$ and $f_D$ are composite focal lengths of the first, second, third and fourth groups of lenses $L_A$, $L_B$, $L_C$ and $L_D$, respectively; $r_{A1}$, $r_{A2}$, ... $r_{A5}$; $r_{B1}$, $r_{B2}$, ... $r_{B7}$; $r_{C1}$, $r_{C2}$, $r_{C3}$; and $r_{D1}$, $r_{D2}$, ... $r_{D9}$ are radii of curvatures of the lenses as numbered successively from an object side; $d_{A1}$, $d_{A2}$, ... $d_{A5}$; $d_{B1}$, $d_{B2}$, ... $d_{B7}$; $d_{C1}$, $d_{C2}$, $d_{C3}$; and $d_{D1}$, ... $d_{D8}$ are axial thicknesses of or air spaces between the lenses as numbered successively from the object side: $n_{A1}$ ... $n_{A3}$; $n_{B1}$ ... $n_{B4}$; $n_{C1}$, $n_{C2}$, and $n_{D1}$, $n_{D2}$, ... $n_{D5}$ are refractive indexes of the lenses as numbered successively from the object side; and $\nu_{A1}$ ... $\nu_{A3}$, $\nu_{B1}$ ... $\nu_{B4}$, $\nu_{C1}$, $\nu_{C2}$ and $\nu_{D1}$ ... $\nu_{D5}$ are Abbe's numbers.

Figure 3A:
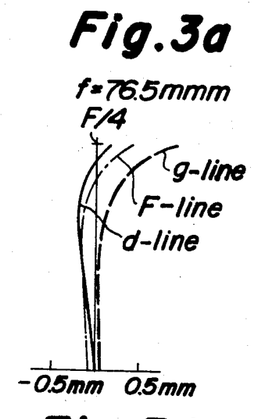
FIGS. 3a to 3i show aberration characteristic curves of one embodiment of the invention.
Figure 3B:
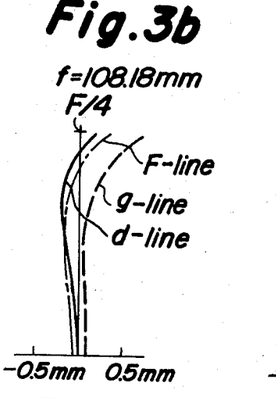
Figure 3C:
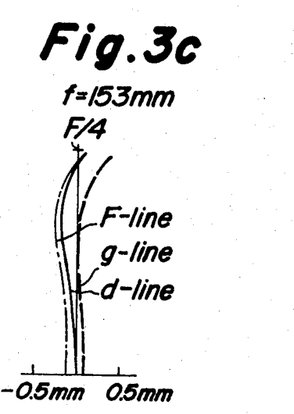
Figure 3D:
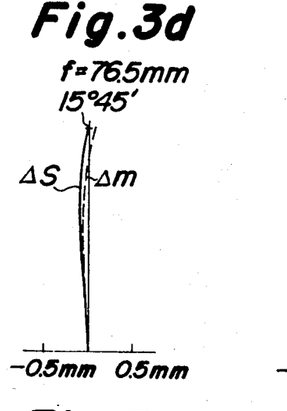
Figure 3E:
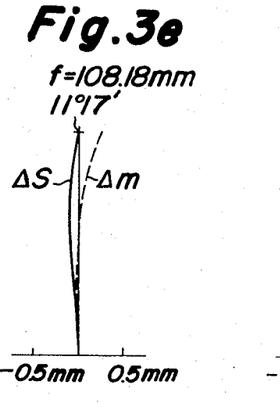
Figure 3F:
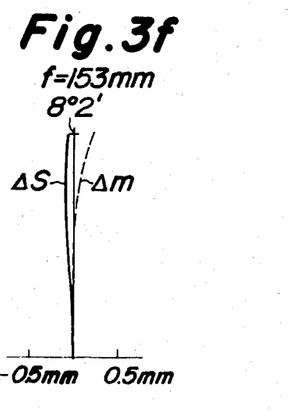
Figure 3G:
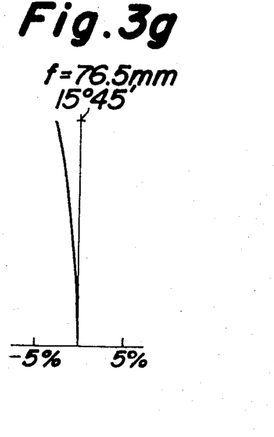
Figure 3H:
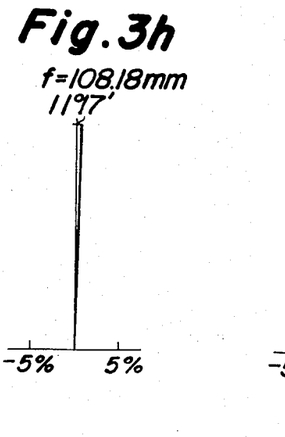
Figure 3I:
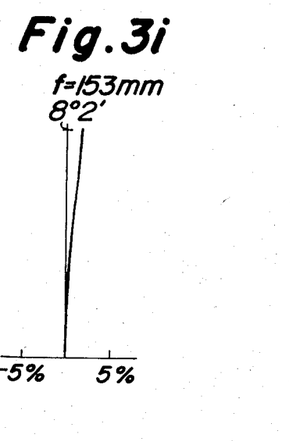

The various aberration characteristic curves of the present embodiment are shown in FIGS. 3a to 3i in which FIGS. 3a to 3c show the spherical aberrations at $f$=76.5mm, 108.18mm and 153mm, respectively, FIGS. 3d to 3f the astigmatisms at $f$=76.5mm, 108.18mm and 153mm, respectively, and FIGS. 3g to 3i the distortions at $f$=76.5mm, 108.18mm and 153mm, respectively.

EXAMPLE 2

A varifocal lens system of the present example is also constructed as shown in FIG. 1.

The present embodiment is defined by the values as mentioned in the following Table.

$f$=80 mm.-160 mm., F/4

| | | | | |
|---|---|---|---|---|
| $f_A$=105.414 | $r_{A1}$=81.4854<br>$r_{A2}$=510.825<br>$r_{A3}$=78.707<br>$r_{A4}$=46.332<br>$r_{A5}$=1,045.039 | $d_{A1}$=4.3<br>$d_{A2}$=0.2<br>$d_{A3}$=2.0<br>$d_{A4}$=6.4<br>$d_{A5}$=2.786-28.255 | $n_{A1}$=1.51633<br>$n_{A2}$=1.74077<br>$n_{A3}$=1.51821 | $\nu_{A1}$=64.15<br>$\nu_{A2}$=27.79<br>$\nu_{A3}$=65.04 |
| $f_B$=−36.019 | $r_{B1}$=−188.39<br>$r_{B2}$=150.323<br>$r_{B3}$=−82.27<br>$r_{B4}$=−253.477<br>$r_{B5}$=40.941<br>$r_{B6}$=−34.967<br>$r_{B7}$=1,479.481 | $d_{B1}$=1.6<br>$d_{B2}$=3.1<br>$d_{B3}$=0.4<br>$d_{B4}$=1.5<br>$d_{B5}$=5.5<br>$d_{B6}$=1.5<br>$d_{B7}$=27.103-1.634 | $n_{B1}$=1.618<br>$n_{B2}$=1.78472<br>$n_{B3}$=1.5725<br>$n_{B4}$=1.618 | $\nu_{B1}$=63.38<br>$\nu_{B2}$=25.71<br>$\nu_{B3}$=57.65<br>$\nu_{B4}$=63.38 |
| $f_C$=92.837 | $r_{C1}$=92.52<br>$r_{C2}$=37.984<br>$r_{C3}$=−104.14 | $d_{C1}$=1.2<br>$d_{C2}$=4.2<br>$d_{C3}$=6.971-6.971 | $n_{C1}$=1.74077<br>$n_{C2}$=1.6223 | $\nu_{C1}$=27.79<br>$\nu_{C2}$=53.2 |
| $f_D$=99.674 | $r_{D1}$=26.038<br>$r_{D2}$=∞<br>$r_{D3}$=25.812<br>$r_{D4}$=−67.691<br>$r_{D5}$=18.129<br>$r_{D6}$=61.368<br>$r_{D7}$=−33.881<br>$r_{D8}$=−32.92<br>$r_{D9}$=560.15 | $d_{D1}$=5<br>$d_{D2}$=0.4<br>$d_{D3}$=6.4<br>$d_{D4}$=2.1<br>$d_{D5}$=30<br>$d_{D6}$=7<br>$d_{D7}$=1.5<br>$d_{D8}$=1.5 | $n_{D1}$=1.151633<br>$n_{D2}$=1.51009<br>$n_{D3}$=1.744<br>$n_{D4}$=1.60342<br>$n_{D5}$=1.66998 | $\nu_{D1}$=64.15<br>$\nu_{D2}$=63.63<br>$\nu_{D3}$=44.78<br>$\nu_{D4}$=38.01<br>$\nu_{D5}$=39.32 |

Figure 4A:
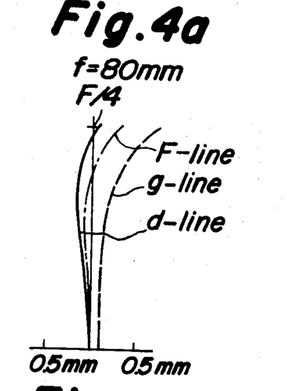
FIGS. 4a to 4i show aberration characteristic curves of another embodiment of the invention.
Figure 4B:
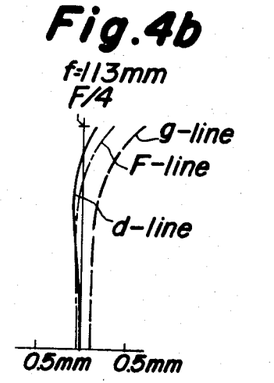
Figure 4C:
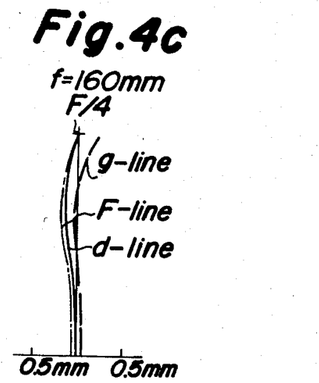
Figure 4D:
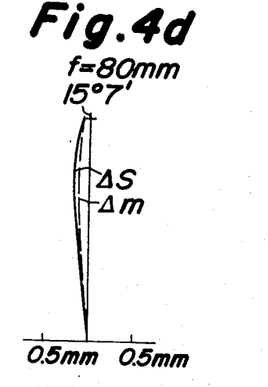
Figure 4E:
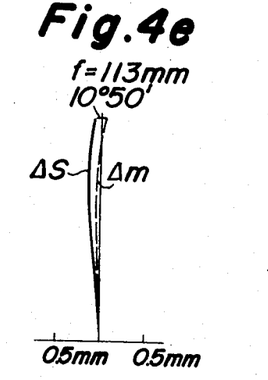
Figure 4F:
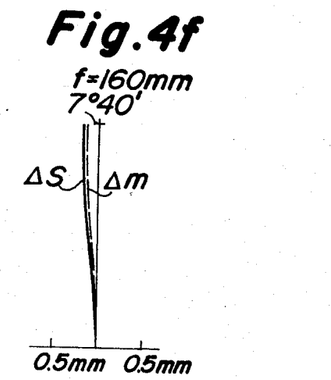
Figure 4G:
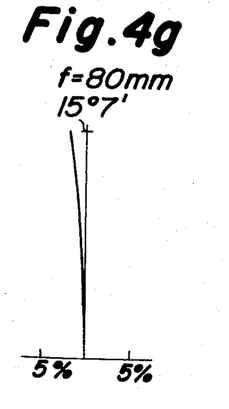
Figure 4H:
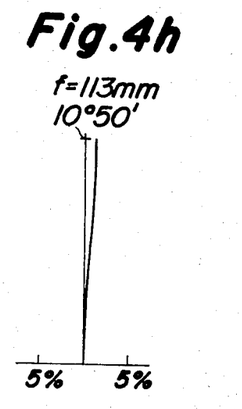
Figure 4I:
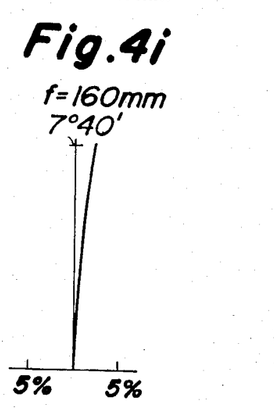

The various aberration characteristic curves of the present embodiment are shown in FIGS. 4a to 4i in which FIGS. 4a to 4c show the spherical aberrations at $f$=80mm, 113mm and 160mm, respectively, FIGS. 4d to 4f the astigmatisms at $f$=80mm, 113mm and 160mm, respectively, and FIGS. 4g to 4i the distortions at $f$=80mm, 113mm and 160mm, respectively.

EXAMPLE 3

A varifocal lens system of the present example is also constructed as shown in FIG. 1.

The present embodiment is defined by the values as mentioned in the following Table.

$f$=76.5mm-153mm, F/4

| | | | | |
|---|---|---|---|---|
| $f_A$=100.023 | $r_{A1}$=78.828<br>$r_{A2}$=441.679<br>$r_{A3}$=74.639<br>$r_{A4}$=44.11<br>$r_{A5}$=1,742.45 | $d_{A1}$=4.09<br>$d_{A2}$=0.19<br>$d_{A3}$=1.9<br>$d_{A4}$=5.8 | | |
| $f_B$=−34.432 | $r_{B1}$=−175.362<br>$r_{B2}$=133.175<br>$r_{B3}$=−80.74<br>$r_{B4}$=−214.635<br>$r_{B5}$=39.98<br>$r_{B6}$=−35.068<br>$r_{B7}$=626.88 | 2.086-26.433<br>$d_{B1}$=1.7<br>$d_{B2}$=2.96<br>$d_{B3}$=0.38<br>$d_{B4}$=1.43<br>$d_{B5}$=5.26<br>$d_{B6}$=1.43 | | |
| $f_C$=88.145 | $r_{C1}$=84.07<br>$r_{C2}$=36.191<br>$r_{C3}$=−105.44 | 25.371-1.024<br>$d_{C1}$=1.13<br>$d_{C2}$=3.95 | | |
| $f_D$=95.3 | $L_{DF}$ { $r_{D1}$=24.398<br>$r_{D2}$=∞<br>$L_{DM}$ { $r_{D3}$=23.802<br>$r_{D4}$=−58.134<br>$r_{D5}$=−56.853<br>$r_{D6}$=16.931<br>$L_{DB}$ { $r_{D7}$=57.497<br>$r_{D8}$=−30.905<br>$r_{D9}$=−29.94<br>$r_{D10}$=637.361 | 6.707-6.707<br>$d_{D1}$=4.74<br>$d_{D2}$=0.29<br>$d_{D3}$=6.13<br>$d_{D4}$=0.21<br>$d_{D5}$=2.1<br>$d_{D6}$=28.38<br>$d_{D7}$=7.0<br>$d_{D8}$=1.48<br>$d_{D9}$=1.43 | | |

| | | |
|---|---|---|
| $L_A$ | $n_{A1}$=1.51633<br>$n_{A2}$=1.74077<br>$n_{A3}$=1.51821 | $\nu_{A1}$=64.15<br>$\nu_{A2}$=27.79<br>$\nu_{A3}$=65.04 |
| $L_B$ | $n_{B1}$=1.618<br>$n_{B2}$=1.7847<br>$n_{B3}$=1.5725<br>$n_{B4}$=1.618 | $\nu_{B1}$=63.38<br>$\nu_{B2}$=26.22<br>$\nu_{B3}$=57.65<br>$\nu_{B4}$=63.38 |
| $L_C$ | $n_{C1}$=1.74077<br>$n_{C2}$=1.6223 | $\nu_{C1}$=27.79<br>$\nu_{C2}$=53.2 |
| $L_D$ | $n_{D1}$=1.51009<br>$n_{D2}$=1.50048<br>$n_{D3}$=1.744<br>$n_{D4}$=1.60342<br>$n_{D5}$=1.66998 | $\nu_{D1}$=63.63<br>$\nu_{D2}$=65.99<br>$\nu_{D3}$=44.78<br>$\nu_{D4}$=38.01<br>$\nu_{D5}$=39.32 |

Figure 5A:
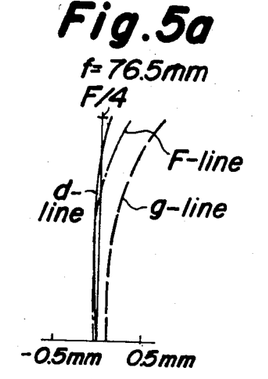
FIGS. 5a to 5i show aberration characteristic curves of a further embodiment of the invention.
Figure 5B:
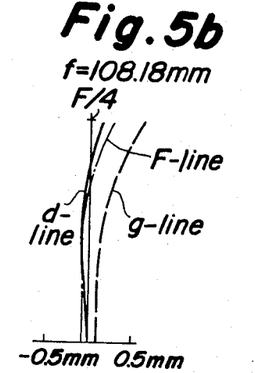
Figure 5C:
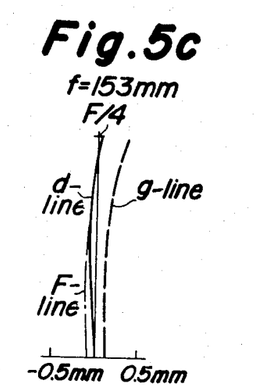
Figure 5D:
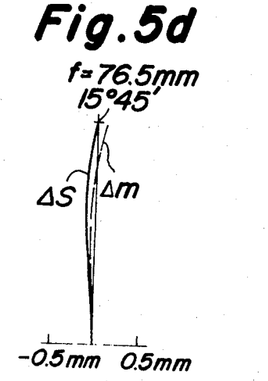
Figure 5E:
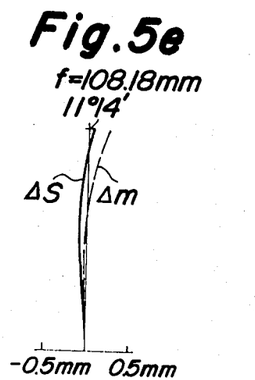
Figure 5F:
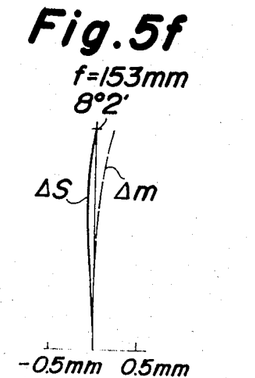
Figure 5G:
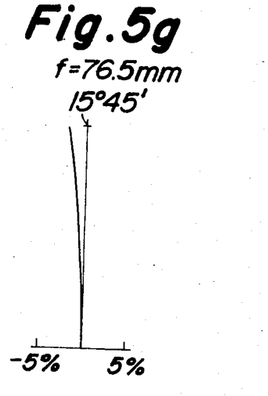
Figure 5H:
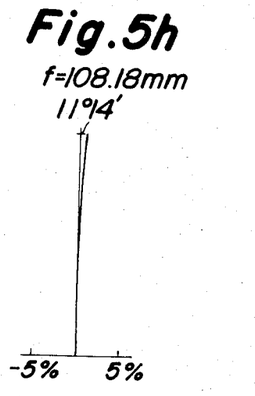
Figure 5I:
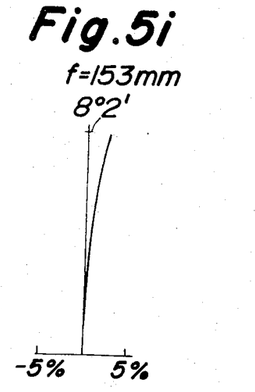

The aberration characteristic curves of the present embodiment are shown in FIGS. 5a to 5i in which FIGS. 5a to 5c show the spherical aberrations at $f$=76.5mm, 108.18mm and 153mm, respectively, FIGS. 4d to 4f the astigmatisms at $f$=76.5mm, 108.18mm and 153mm, respectively, and FIGS. 5g to 5i the distortions at $f=76.5mm$, $108.18mm$ and $153mm$, respectively.

EXAMPLE 4

A varifocal lens system of the present example is constructed as shown in FIG. 2.

The present embodiment is defined by the values as mentioned in the following Table, in which the values of the fourth group of lenses $L_D$ only are different from those of the example 3.

$f=76.5mm-153mm$, F/4

$f_A=100.023$
- $r_{A1}=78.828$, $d_{A1}=4.09$
- $r_{A2}=441.679$, $d_{A2}=0.19$
- $r_{A3}=74.639$, $d_{A3}=1.9$
- $r_{A4}=44.11$, $d_{A4}=5.8$
- $r_{A5}=1,742.45$ 2.086–26.433

$f_B=-34.432$
- $r_{B1}=-175.362$, $d_{B1}=1.7$
- $r_{B2}=133.175$, $d_{B2}=1.96$
- $r_{B3}=-80.74$, $d_{B3}=0.38$
- $r_{B4}=-214.635$, $d_{B4}=1.43$
- $r_{B5}=39.98$, $d_{B5}=5.26$
- $r_{B6}=-35.068$, $d_{B6}=1.43$
- $r_{B7}=626.88$ 25.371–1.024

$f_C=88.145$
- $r_{C1}=84.07$, $d_{C1}=1.13$
- $r_{C2}=36.191$, $d_{C2}=3.95$
- $r_{C3}=-105.44$ 6.707–6.707

$f_D=95.369$
- $L_{DF}$:
  - $r_{D1}=25.913$, $d_{D1}=3.3$
  - $r_{D2}=108.255$, $d_{D2}=0.15$
  - $r_{D3}=46.923$, $d_{D3}=2.5$
  - $r_{D4}=98.549$, $d_{D4}=0.2$
- $L_{DM}$:
  - $r_{D5}=24.83$, $d_{D5}=5.74$
  - $r_{D6}=-115.109$, $d_{D6}=2.0$
  - $r_{D7}=16.95$, $d_{D7}=26.0$
- $L_{DR}$:
  - $r_{D8}=51.876$, $d_{D8}=7.0$
  - $r_{D9}=-28.103$, $d_{D9}=1.44$
  - $r_{D10}=-26.962$, $d_{D10}=1.43$
  - $r_{D11}=248.554$ $L_A$: $n_{A1}=1.51633$, $\nu_{A1}=64.15$; $n_{A2}=1.74077$, $\nu_{A2}=27.79$; $n_{A3}=1.51821$, $\nu_{A3}=65.04$ $L_B$: $n_{B1}=1.618$, $\nu_{B1}=63.38$; $n_{B2}=1.7847$, $\nu_{B2}=26.22$; $n_{B3}=1.5725$, $\nu_{B3}=57.65$; $n_{B4}=1.618$, $\nu_{B4}=63.38$ $L_C$: $n_{C1}=1.74077$, $\nu_{C1}=27.79$; $n_{C2}=1.6223$, $\nu_{C2}=53.2$ $L_D$: $n_{D1}=1.50378$, $\nu_{D1}=66.81$; $n_{D2}=1.50048$, $\nu_{D2}=65.99$; $n_{D3}=1.50378$, $\nu_{D3}=66.81$; $n_{D4}=1.744$, $\nu_{D4}=44.78$; $n_{D5}=1.60717$, $\nu_{D5}=40.34$; $n_{D6}=1.66755$, $\nu_{D6}=41.93$

Figure 6A:
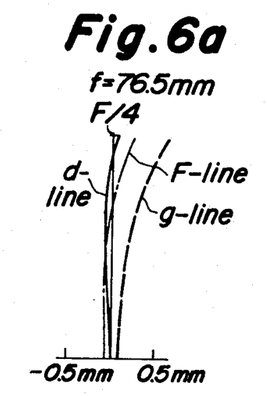
FIGS. 6a to 6i show aberration characteristic curves of a still further embodiment of the invention.
Figure 6B:
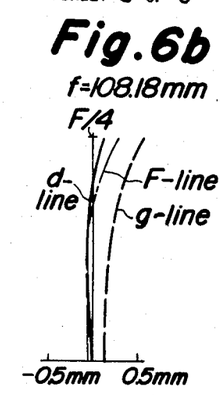
Figure 6C:
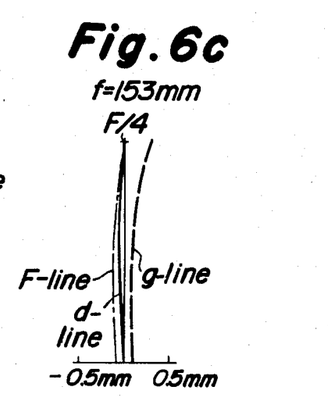
Figure 6D:
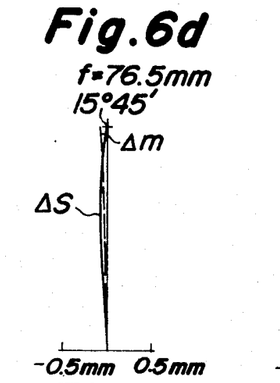
Figure 6E:
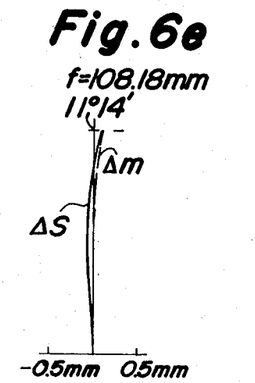
Figure 6F:
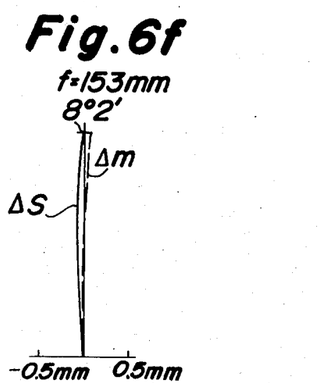
Figure 6G:
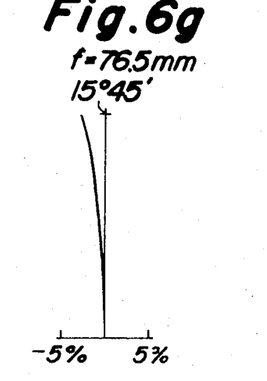
Figure 6H:
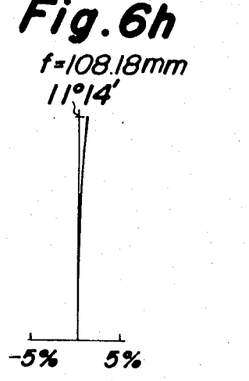
Figure 6I:
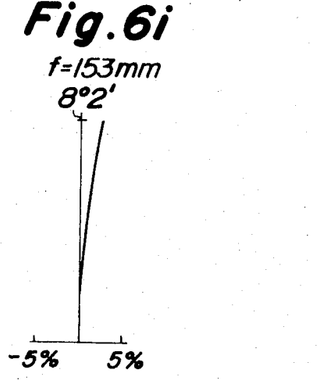

The aberration characteristic curves of the present embodiment are shown in FIGS. 6a to 6i in which FIGS. 6a to 6c show the spherical aberrations at $f=76.5mm$, $108.18mm$ and $153mm$, respectively, FIGS. 6d to 6f the astigmatisms at $f=76.5mm$, $108.18mm$ and $153mm$, respectively, and FIGS. 6g to 6i show the distortions at $f=76.5mm$, $108.18mm$ and $153mm$, respectively.

As seen from the various aberration characteristic curves shown in FIGS. 3a to 3i, 4a to 4i, 5a to 5i, and 6a to 6i the varifocal lens system according to the invention makes it possible to significantly correct the spherical aberration, astigmatism and distortion with balanced state at different zoom positions.

It will be understood that changes may be made in the details without departing from the spirit of the invention, especially as defined in the following claims.

What is claimed is:

1. In a varifocal lens system comprising a varifocal optical system and a prime optical system, said varifocal optical system consisting of a first group of lenses having a positive refractive power, second group of lenses having a negative refractive power and third group of lenses having a positive refractive power, said prime optical system consisting of a fourth group of lenses having a positive refractive power, and the change in position of the final image produced by the movement in a direction of the optical axis of said second group of lenses being adapted to be corrected by the reciprocal movement of said third group of lenses, the improvement wherein the said second group of lenses is constructed as 3 components and 4 lenses and consists of a first biconcave negative lens, second biconvex positive lens, third negative lens and fourth negative lens and in which said first and second lenses are combined together to form a composite lens having a positive refractive power and said third lens has its image side a deep concave surface and said fourth lens has its object side a deep concave surface, said third and fourth lenses being arranged such that their deep concave surfaces stand opposite each other with an air space therebetween, and said second group of lenses being defined by the following six conditions; i.e.

$$r_{B1} < 0 \quad \ldots (1)$$

$$2.0|f_B| < |r_{B1}| < \infty \quad \ldots (2)$$

$$0 \leq |(1/r_{B3}) - (1/r_{B4})| < (0.4/|f_B|) \quad \ldots (3)$$

$$0.5|f_B| < (r_{B5} + |r_{B6}|/2) < 2.0|f_B| \quad \ldots (4)$$

$$0.08 < n_{B2} - n_{B1} \quad \ldots (5)$$

$$20 < \nu_{B1} - \nu_{B2} \quad \ldots (6)$$

where $r_{Bi}$ ($i=1, 2, \ldots$) are radii of curvatures of the surfaces of the successive lenses from the front surface of the first lens and inclusive of the surface in contact between the first and second lenses, $n_{Bi}$ ($i=1, 2, \ldots$) are axial center thicknesses of or air spaces between the successive lenses, $\nu_{Bi}$ ($i=1, 2, \ldots$) are Abbe's numbers of the successive lenses, and $f_B$ is a composite focal length of the second group of lenses, and wherein the system is defined by the following values, i.e.

f=76.5 mm.-153 mm., F/4

| | | | | |
|---|---|---|---|---|
| $f_A=100.023$ | $r_{A1}=78.829$<br>$r_{A2}=441.679$<br>$r_{A3}=74.639$<br>$r_{A4}=44.11$<br>$r_{A5}=1,742.45$ | $d_{A1}=4.09$<br>$d_{A2}=0.19$<br>$d_{A3}=1.9$<br>$d_{A4}=5.8$<br>$d_{A5}=2.086$-$26.433$ | $n_{A1}=1.51633$<br>$n_{A2}=1.74077$<br>$n_{A3}=1.51821$ | $\nu_{A1}=64.15$<br>$\nu_{A2}=27.79$<br>$\nu_{A3}=65.04$ |
| $f_B=-34.432$ | $r_{B1}=-175.362$<br>$r_{B2}=133.175$<br>$r_{B3}=-80.74$<br>$r_{B4}=-214.635$<br>$r_{B5}=39.98$<br>$r_{B6}=-35.068$<br>$r_{B7}=626.88$ | $d_{B1}=1.7$<br>$d_{B2}=2.96$<br>$d_{B3}=0.38$<br>$d_{B4}=1.43$<br>$d_{B5}=5.26$<br>$d_{B6}=1.43$<br>$d_{B7}=25.371$-$1.024$ | $n_{B1}=1.618$<br>$n_{B2}=1.7847$<br>$n_{B3}=1.5725$<br>$n_{B4}=1.618$ | $\nu_{B1}=63.38$<br>$\nu_{B2}=26.22$<br>$\nu_{B3}=57.65$<br>$\nu_{B4}=63.38$ |
| $f_C=88.145$ | $r_{C1}=84.07$<br>$r_{C2}=36.191$<br>$r_{C3}=-105.44$ | $d_{C1}=1.13$<br>$d_{C2}=3.95$<br>$d_{C3}=6.707$-$6.707$ | $n_{C1}=1.74077$<br>$n_{C2}=1.6223$ | $\nu_{C1}=27.79$<br>$\nu_{C2}=53.2$ |
| $f_E=95.347$ | $r_{D1}=24.56$<br>$r_{D2}=\infty$<br>$r_{D3}=24.422$<br>$r_{D4}=-61.605$<br>$r_{D5}=17.088$<br>$r_{D6}=57.836$<br>$r_{D7}=-31.791$<br>$r_{D8}=-30.887$<br>$r_{D9}=455.31$ | $d_{D1}=4.78$<br>$d_{D2}=0.38$<br>$d_{D3}=6.12$<br>$d_{D4}=2$<br>$d_{D5}=28.37$<br>$d_{D6}=7$<br>$d_{D7}=1.43$<br>$d_{D8}=1.43$ | $n_{D1}=1.51633$<br>$n_{D2}=1.51009$<br>$n_{D3}=1.744$<br>$n_{D4}=1.60342$<br>$n_{D5}=1.66998$ | $\nu_{D1}=64.15$<br>$\nu_{D2}=63.63$<br>$\nu_{D3}=44.78$<br>$\nu_{D4}=38.01$<br>$\nu_{D5}=39.32$ |

2. In a varifocal lens system comprising a varifocal optical system and a prime optical system, said varifocal optical system consisting of a first group of lenses having a positive refractive power, second group of lenses having a negative refractive power and third group of lenses having a positive refractive power, said prime optical system consisting of a fourth group of lenses having a positive refractive power, and the change in position of the final image produced by the movement in a direction of the optical axis of said second group of lenses being adapted to be corrected by the reciprocal movement of said third group of lenses, the improvement wherein the said second group of lenses is constructed as 3 components and 4 lenses and consists of a first biconcave negative lens, second biconvex positive lens, third negative lens and fourth negative lens and in which said first and second lenses are combined together to form a composite lens having a positive refractive power and said third lens has its image side a deep concave surface and said fourth lens has its object side a deep concave surface, said third and fourth lenses being arranged such that their deep concave surfaces stand opposite each other with an air space therebetween, and said second group of lenses being defined by the following six conditions; i.e.

$$r_{B1} < 0 \qquad ...(1)$$

$$2.0|f_B| < |r_{B1}| < \infty \qquad ...(2)$$

$$0 \leq |(1/r_{B3}) - (1/r_{B4})| < (0.4/|f_B|) \qquad ...(3)$$

$$0.5|f_B| < (r_{B5} + |r_{B6}|/2) < 2.0|f_B| \qquad ...(4)$$

$$0.08 < n_{B2} - n_{B1} \qquad ...(5)$$

$$20 < \nu_{B1} - \nu_{B2} \qquad ...(6)$$

where $r_{Bi}$ ($i=1, 2, ...$) are radii of curvatures of the surfaces of the successive lenses from the front surface of the first lens and inclusive of the surface in contact between the first and second lenses, $n_{Bi}$ ($i=1, 2, ...$) are axial center thickness of or air spaces between the successive lenses, $\nu_{Bi}$ ($i=1, 2, ...$) are Abbe's numbers of the successive lenses, and $f_B$ is a composite focal length of the second group of lenses, and wherein the system is defined by the following values, i.e.

f=80 mm.-160 mm., F/4

| | | | | |
|---|---|---|---|---|
| $f_A=105.414$ | $r_{A1}=81.4854$<br>$r_{A2}=510.825$<br>$r_{A3}=78.707$<br>$r_{A4}=46.332$<br>$r_{A5}=1,045.039$ | $d_{A1}=4.3$<br>$d_{A2}=0.2$<br>$d_{A3}=2.0$<br>$d_{A4}=6.1$<br>$d_{A5}=2.786$-$28.255$ | $n_{A1}=1.51633$<br>$n_{A2}=1.74077$<br>$n_{A3}=1.51821$ | $\nu_{A1}=64.15$<br>$\nu_{A2}=27.79$<br>$\nu_{A3}=65.04$ |
| $f_B=36.019$ | $r_{B1}=-188.39$<br>$r_{B2}=150.323$<br>$r_{B3}=-82.27$<br>$r_{B4}=-253.477$<br>$r_{B5}=40.941$<br>$r_{B6}=-34.967$<br>$r_{B7}=1,479.481$ | $d_{B1}=1.6$<br>$d_{B2}=3.1$<br>$d_{B3}=0.4$<br>$d_{B4}=1.5$<br>$d_{B5}=5.5$<br>$d_{B6}=1.5$<br>$d_{B7}=27.103$-$1.634$ | $n_{B1}=1.618$<br>$n_{B2}=1.78472$<br>$n_{B3}=1.5725$<br>$n_{B4}=1.618$ | $\nu_{B1}=63.38$<br>$\nu_{B2}=25.71$<br>$\nu_{B3}=57.65$<br>$\nu_{B4}=63.38$ |
| $f_C=92.837$ | $r_{C1}=92.52$<br>$r_{C2}=37.984$<br>$r_{C3}=-104.14$ | $d_{C1}=1.2$<br>$d_{C2}=4.2$<br>$d_{C3}=6.971$-$6.971$ | $n_{C1}=1.74077$<br>$n_{C2}=1.6223$ | $\nu_{C1}=27.79$<br>$\nu_{C2}=53.2$ |
| $f_D=99.674$ | $r_{D1}=26.038$<br>$r_{D2}=\infty$<br>$r_{D3}=25.812$<br>$r_{D4}=-67.691$<br>$r_{D5}=18.129$<br>$r_{D6}=61.368$<br>$r_{D7}=-33.881$<br>$r_{D8}=-32.92$<br>$r_{D9}=560.15$ | $d_{D1}=5$<br>$d_{D2}=0.4$<br>$d_{D3}=6.4$<br>$d_{D4}=2.1$<br>$d_{D5}=30$<br>$d_{D6}=7$<br>$d_{D7}=1.5$<br>$d_{D8}=1.5$ | $n_{D1}=1.51633$<br>$n_{D2}=1.51009$<br>$n_{D3}=1.744$<br>$n_{D4}=1.60342$<br>$n_{D5}=1.66998$ | $\nu_{D1}=64.15$<br>$\nu_{D2}=63.63$<br>$\nu_{D3}=44.78$<br>$\nu_{D4}=38.01$<br>$\nu_{D5}=39.32$ |

3. In a varifocal lens system comprising a varifocal optical system and a prime optical system, said varifocal optical system consisting of a first group of lenses having a positive refractive power, second group of lenses having a negative refractive power and third group of lenses having a positive refractive power, said prime optical system consisting of a fourth group of lenses having a positive refractive power, and the change in position of the final image produced by the movement in a direction of the optical axis of said second group of lenses being adapted to be corrected by the reciprocal movement of said third group of lenses, the improvement wherein the said second group of lenses is constructed as 3 components and 4 lenses and consists of a first biconcave negative lens, second biconvex positive lens, third negative lens and fourth negative lens and in which said first and second lenses are combined together to form a composite lens having a positive refractive power and said third lens has its image side a deep concave surface and said fourth lens has its object side a deep concave surface, said third and fourth lenses being arranged such that their deep concave surfaces stand opposite each other with an air space therebetween, and said second group of lenses being defined by the following six conditions; i.e.

$$r_{B1} < 0 \quad \ldots (1)$$

$$2.0|f_B| < |r_{B1}| < \infty \quad \ldots (2)$$

$$0 \leq |(1/r_{B3}) - (1/r_{B4})| < (0.4/|f_B|) \quad \ldots (3)$$

$$0.5|f_B| < (r_{B5} + |r_{B6}|/2) < 2.0|f_B| \quad \ldots (4)$$

$$0.08 < n_{B2} - n_{B1} \quad \ldots (5)$$

$$20 < \nu_{B1} - \nu_{B2} \quad \ldots (6)$$

where $r_{Bi}$ ($i=1, 2, \ldots$) are radii of curvatures of the surfaces of the successive lenses from the front surface of the first lens and inclusive of the surface in contact between the first and second lenses, $n_{Bi}$ ($i=1, 2, \ldots$) are axial center thicknesses of or air spaces between the successive lenses, $\nu_{Bi}$ ($i=1, 2, \ldots$) are Abbe's numbers of the successive lenses, and $f_B$ is a composite focal length of the second group of lenses, and wherein the system is defined by the following values, i.e.

$f = 76.5\text{mm} - 153\text{mm}, F/4$ $f_A = 100.023$ $L_A$:
- $r_{A1} = 78.828$, $d_{A1} = 4.09$
- $r_{A2} = 441.679$, $d_{A2} = 0.19$
- $r_{A3} = 74.639$, $d_{A3} = 1.9$
- $r_{A4} = 44.11$, $d_{A4} = 5.8$
- $r_{A5} = 1,742.45$ 2.086–26.433

$f_B = -34.432$ $L_B$:
- $r_{B1} = -175.362$, $d_{B1} = 1.7$
- $r_{B2} = 133.175$, $d_{B2} = 2.96$
- $r_{B3} = -80.74$, $d_{B3} = 0.38$
- $r_{B4} = -214.635$, $d_{B4} = 1.43$
- $r_{B5} = 39.98$, $d_{B5} = 5.26$
- $r_{B6} = -35.068$, $d_{B6} = 1.43$
- $r_{B7} = 626.88$ 25.371–1.024

$f_C = 88.145$ $L_C$:
- $r_{C1} = 84.07$, $d_{C1} = 1.13$
- $r_{C2} = 36.191$, $d_{C2} = 3.95$
- $r_{C3} = -105.44$ 6.707–6.707

$f_D = 95.3$ $L_{Df}$:
- $r_{D1} = 24.398$, $d_{D1} = 4.74$
- $r_{D2} = \infty$, $d_{D2} = 0.29$
- $r_{D3} = 23.802$, $d_{D3} = 6.13$
- $r_{D4} = -58.134$, $d_{D4} = 0.21$
- $r_{D5} = -56.853$, $d_{D5} = 2.1$
- $r_{D6} = 16.931$ $L_{Dn}$:
- $r_{D7} = 57.497$, $d_{D6} = 28.38$
- $r_{D8} = -30.905$, $d_{D7} = 7.0$
- $r_{D9} = -29.94$, $d_{D8} = 1.48$
- $r_{D10} = 637.361$, $d_{D9} = 1.43$ $n_{A1} = 1.51633$, $\nu_{A1} = 64.15$
$n_{A2} = 1.74077$, $\nu_{A2} = 27.79$
$n_{A3} = 1.51821$, $\nu_{A3} = 65.04$
$n_{B1} = 1.618$, $\nu_{B1} = 63.38$
$n_{B2} = 1.7847$, $\nu_{B2} = 26.22$
$n_{B3} = 1.5725$, $\nu_{B3} = 57.65$
$n_{B4} = 1.618$, $\nu_{B4} = 63.38$
$n_{C1} = 1.74077$, $\nu_{C1} = 27.79$
$n_{C2} = 1.6223$, $\nu_{C2} = 53.2$
$n_{D1} = 1.51009$, $\nu_{D1} = 63.63$
$n_{D2} = 1.50048$, $\nu_{D2} = 65.99$
$n_{D3} = 1.744$, $\nu_{D3} = 44.78$
$n_{D4} = 1.60342$, $\nu_{D4} = 38.01$
$n_{D5} = 1.66998$, $\nu_{D5} = 39.32$ 4. In a varifocal lens system comprising a varifocal optical system and a prime optical system, said varifocal optical system consisting of a first group of lenses having a positive refractive power, second group of lenses having a negative refractive power and third group of lenses having a positive refractive power, said prime optical system consisting of a fourth group of lenses having a positive refractive power, and the change in position of the final image produced by the movement in a direction of the optical axis of said second group of lenses being adapted to be corrected by the reciprocal movement of said third group of lenses, the improvement wherein the said second group of lenses is constructed as 3 components and 4 lenses and consists of a first biconcave negative lens, second biconvex positive lens, third negative lens and fourth negative lens and in which said first and second lenses are combined together to form a composite lens having a positive refractive power and said third lens has its image side a deep concave surface and said fourth lens has its object side a deep concave surface, said third and fourth lenses being arranged such that their deep concave surfaces stand opposite each other with an air space therebetween, and said second group of lenses being defined by the following six conditions; i.e.

$$r_{B1} < 0 \quad \ldots (1)$$

$$2.0|f_B| < |r_{B1}| < \infty \quad \ldots (2)$$

$$0 \leq |(1/r_{B3}) - (1/r_{B4})| < (0.4/|f_B|) \quad \ldots (3)$$

$$0.5|f_B| < (r_{B5} + |r_{B6}|/2) < 2.0\, r_B \quad \ldots (4)$$

$$0.08 < n_{B2} - n_{B1} \quad \ldots (5)$$

$$20 < \nu_{B1} - \nu_{B2} \quad \ldots (6)$$

where $r_{Bi}$ ($i = 1, 2, \ldots$) are radii of curvatures of the surfaces of the successive lenses from the front surface of the first lens and inclusive of the surface in contact between the first and second lenses, $n_{Bi}$ ($i=1, 2, \ldots$) are axial center thicknesses of or air spaces between the successive lenses, $\nu_{Bi}$ ($i=1, 2, \ldots$) are Abbe's numbers of the successive lenses, and $f_B$ is a composite focal length of the second group of lenses, and wherein the system is defined by the following values, i.e.

$f = 76.5\text{mm}-153\text{mm}, \text{F}/4$ $f_A = 100.023$
$\begin{cases} r_{A1}=78.828 \\ r_{A2}=441.679 \\ r_{A3}=74.639 \\ r_{A4}=44.11 \\ r_{A5}=1,742.45 \end{cases}$
$\begin{cases} d_{A1}=4.09 \\ d_{A2}=0.19 \\ d_{A3}=1.9 \\ d_{A4}=5.8 \end{cases}$
$f_D = 95.369$ $2.086-26.433$ $f_B = -34.432$
$\begin{cases} r_{B1}=-175.362 \\ r_{B2}=133.175 \\ r_{B3}=-80.74 \\ r_{B4}=-214.635 \\ r_{B5}=39.98 \\ r_{B6}=-35.068 \\ r_{B7}=626.88 \end{cases}$
$\begin{cases} (d_{B1}=1.7 \\ d_{B2}=2.96 \\ d_{B3}=0.38 \\ d_{B4}=1.43 \\ d_{B5}=5.26 \\ d_{B6}=1.43 \end{cases}$
$L_A$
$L_B$
$L_C$ $25.371-1.024$ $f_C = 88.145$
$\begin{cases} r_{C1}=84.07 \\ r_{C2}=36.191 \\ r_{C3}=-105.44 \end{cases}$
$\begin{cases} d_{C1}=1.13 \\ d_{C2}=3.95 \end{cases}$
$L_D$ $6.707-6.707$ $L_{Df} \begin{cases} r_{D1}=25.913 \\ r_{D2}=108.255 \\ r_{D3}=46.923 \\ r_{D4}=98.549 \end{cases}$
$L_{DM} \begin{cases} r_{D5}=24.83 \\ r_{D6}=-115.109 \\ r_{D7}=16.95 \end{cases}$
$L_{DR} \begin{cases} r_{D8}=51.876 \\ r_{D9}=-28.103 \\ r_{D10}=-26.962 \\ r_{D11}=248.554 \end{cases}$ $\begin{cases} d_{D1}=3.3 \\ d_{D2}=0.15 \\ d_{D3}=2.5 \\ d_{D4}=0.2 \\ d_{D5}=5.74 \\ d_{D6}=2.0 \\ d_{D7}=26.0 \\ d_{D8}=7.0 \\ d_{D9}=1.44 \\ d_{D10}=1.43 \end{cases}$ $n_{A1}=1.51633$
$n_{A2}=1.74077$
$n_{A3}=1.51821$
$n_{B1}=1.618$
$n_{B2}=1.7847$
$n_{B3}=1.5725$
$n_{B4}=1.618$
$n_{C1}=1.74077$
$n_{C2}=1.6223$
$n_{D1}=1.50378$
$n_{D2}=1.50048$
$n_{D3}=1.50378$
$n_{D4}=1.744$
$n_{D5}=1.60717$
$n_{D6}=1.66755$ $\nu_{A1}=64.15$
$\nu_{A2}=27.79$
$\nu_{A3}=65.04$
$\nu_{B1}=63.38$
$\nu_{B2}=26.22$
$\nu_{B3}=57.65$
$\nu_{B4}=63.38$
$\nu_{C1}=27.79$
$\nu_{C2}=53.2$
$\nu_{D1}=66.81$
$\nu_{D2}=65.99$
$\nu_{D3}=66.81$
$\nu_{D4}=44.78$
$\nu_{D5}=40.34$
$\nu_{D6}=41.93$

\* \* \* \* \*